Feb. 26, 1935.  H. C. MARMON ET AL  1,992,496
MOTOR VEHICLE
Filed Jan. 31, 1933  8 Sheets-Sheet 1

INVENTORS
Howard C. Marmon
BY and George H. Freers,
Hood + Hahn.
ATTORNEYS

Feb. 26, 1935.  H. C. MARMON ET AL  1,992,496
MOTOR VEHICLE
Filed Jan. 31, 1933  8 Sheets-Sheet 2

INVENTORS
Howard C. Marmon
BY and George H. Freers,
Hood + Hahn
ATTORNEYS

Feb. 26, 1935.   H. C. MARMON ET AL   1,992,496
MOTOR VEHICLE
Filed Jan. 31, 1933    8 Sheets-Sheet 5

INVENTORS
Howard C. Marmon
BY and George H. Freers,
Hood + Hahn
ATTORNEYS

Feb. 26, 1935.  H. C. MARMON ET AL  1,992,496
MOTOR VEHICLE
Filed Jan. 31, 1933  8 Sheets-Sheet 6

INVENTORS
Howard C. Marmon
BY and George H. Freers,
Hood & Hahn
ATTORNEYS

Patented Feb. 26, 1935

1,992,496

UNITED STATES PATENT OFFICE 1,992,496

MOTOR VEHICLE

Howard C. Marmon and George H. Freers, Indianapolis, Ind.; said Freers assignor to said Marmon Application January 31, 1933, Serial No. 654,368

7 Claims. (Cl. 180—54)

The object of our invention is to provide certain improvements in details of automobile construction more particularly in the general construction of the chassis, in the relation between the chassis and the passenger-carrying body, and in the details of front-wheel mounting by which the two front wheels are independently sprung and so guided that no lateral slippage of the wheels results from vertical movement of the chassis frame relative to those wheels.

The connection between the front wheels and the main frame of the chassis is also such as to provide maximum ease of steering consistent with stability.

The accompanying drawings illustrate our invention.

In the drawings 20 indicates a differential casing in which is journaled acceptable differential gearing of well-known form (not shown) to which the two driving shafts 21, 21 are flexibly connected in a well-known manner and extended respectively to the two rear driving wheels 22, 22.

Secured to the upper side of casing 20 are two laterally-extended leaf springs 23, 23 and secured to the under side of said casing are two similar springs 24, 24. Secured to and supported by the outer ends of the springs 23 and 24 are bearings 25, 25 upon which the rear wheels 22 are journaled.

Secured to, or integral with, casing 20 at its rear is a plate 27, conveniently circular and arranged substantially in a vertical plane parallel with shafts 21 and secured to this plate are two transverse beams 30 and 31 connected near their outer ends by vertical rearwardly-extending plates 32, 32, the rear ends of which are connected by the channel 33. The frame formed by means 30, 31, plates 32, 32 and channel 33 is designed and adapted to support a gasoline tank (not shown).

At the front of casing 20, conveniently integral therewith is a substantially vertical annular flange 35 to which is bolted the annular flange 36 at the rear end of a tubular casing 37 provided at its front end with an annular flange 38. Casing 37 serves as a housing for suitable transmission gearing.

Secured to the flange 38 is the annular flange 39 of a thimble 40 into which is secured the rear end of a tube 41 composed of two mating portions integral with the forwardly-projecting channels 42 and welded together on a medial vertical plane.

The propeller shaft (not shown) will project forwardly from the transmission gearing through tubular portion 41 for connection through a conventional clutch to the motor (indicated at 43) which will be supported on the channels 42.

Figure 4:
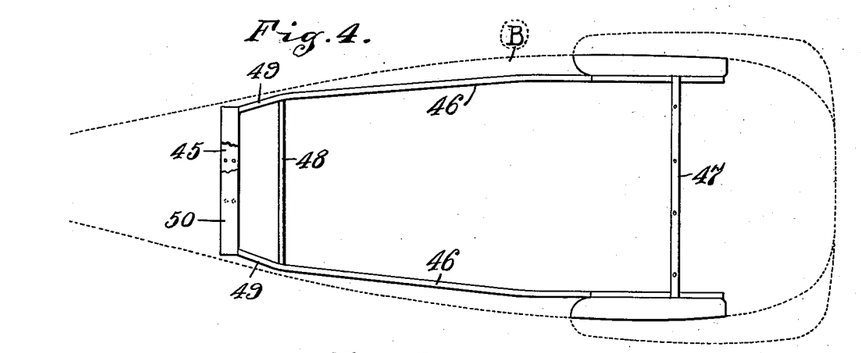
Fig. 4 a diagrammatic plan of the foundation frame of the body with the body shell outlined in dotted lines.
Figures 5, 6:
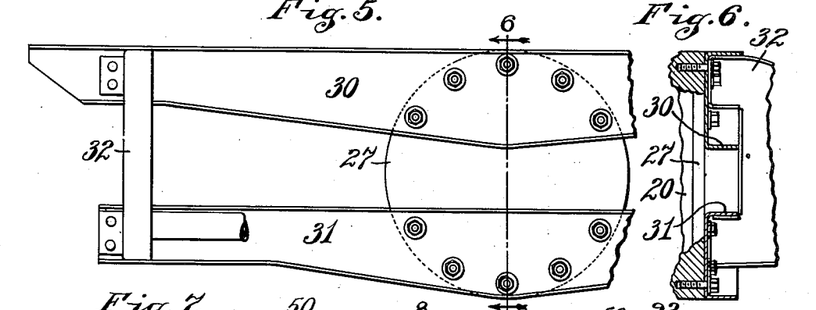
Fig. 5 a fragmentary rear elevation of the rear body-supporting sill of the chassis.
Fig. 6 a vertical section on line 6—6 of Fig. 5.
Figure 7:
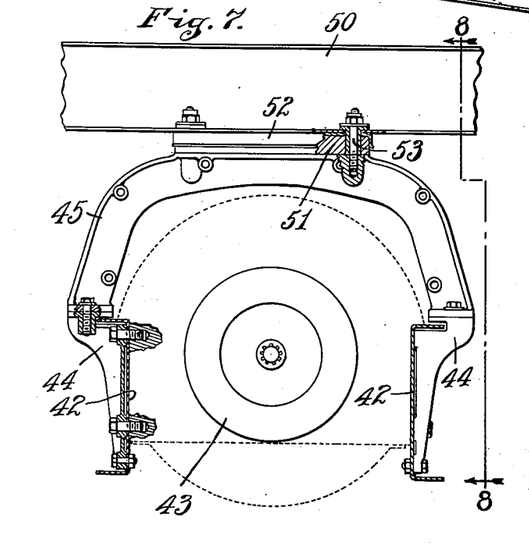
Fig. 7 a vertical section largely on line 7—7 of Fig. 1, on a larger scale and to some extent in a plane slightly to the rear of line 7—7.
Figure 8:
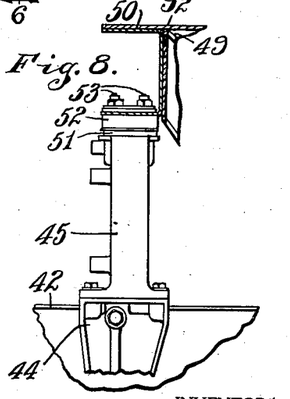
Fig. 8 a fragmentary elevation, in partial section, on line 8—8 of Fig. 7.
Figure 9:
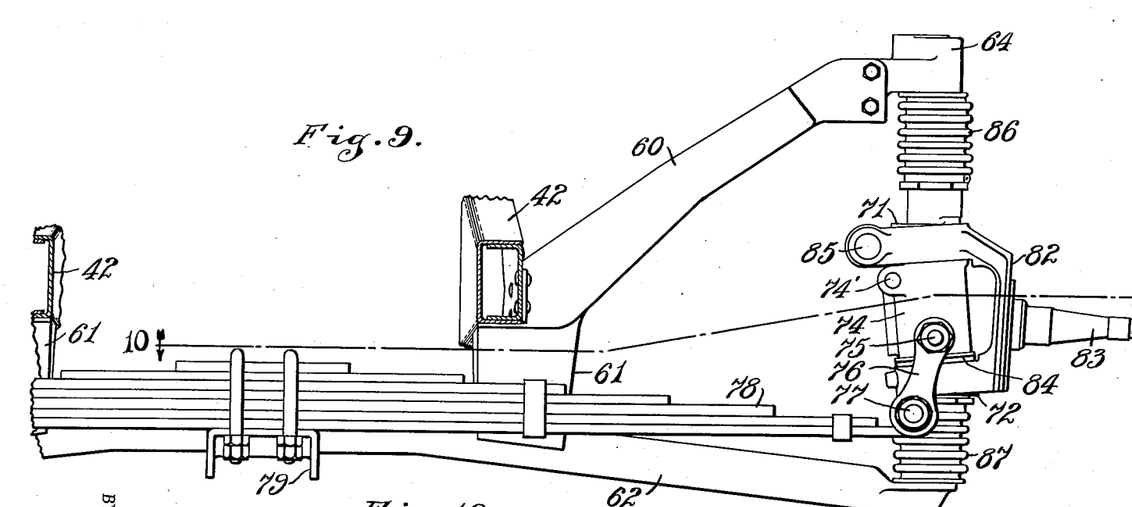
Fig. 9 a front elevation of one end of the front axle with the front ends of the chassis frame in vertical section.
Figure 10:
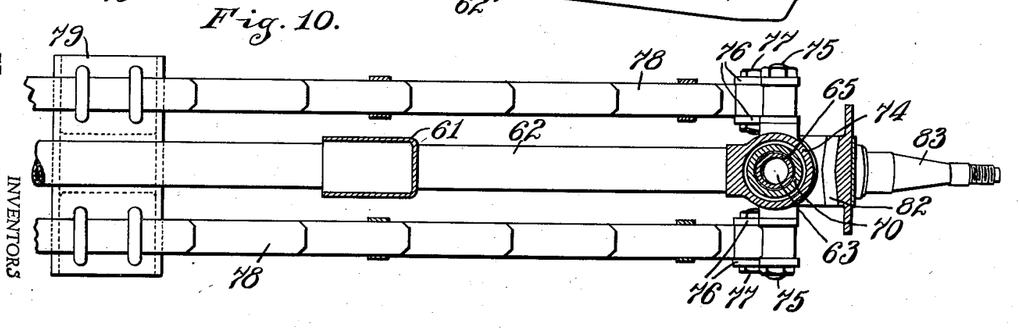
Fig. 10 a section on line 10—10 of Fig. 9.

Secured to channels 42 are brackets 44 (Figs. 7 and 8) upon which is mounted an arch 45 which forms a cross-tie for channels 42 and a support for the forward end of the passenger-carrying body B. The body B has, as a foundation, a main base frame (Fig. 4) comprising side channels 46, 46, rear cross-bar 47, front cross-bar 48, and such other intermediate cross-bars as may be necessary for desired frame-rigidity and support of flooring, seats and body-shell.

Figure 1:
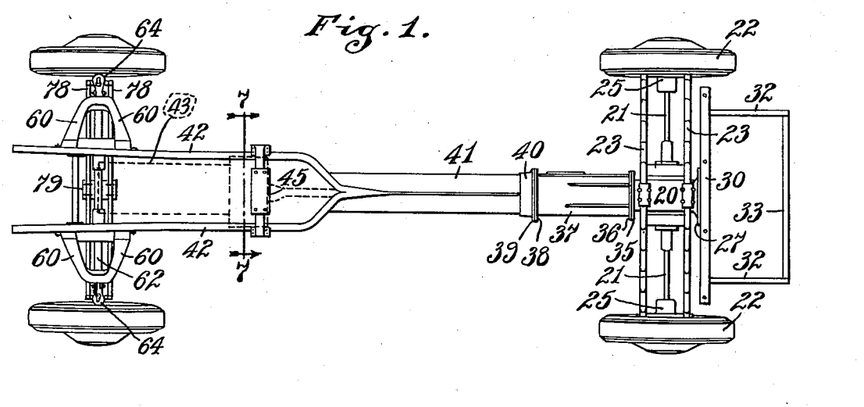
Fig. 1 is a plan of an embodiment of our improved chassis.
Figure 2:
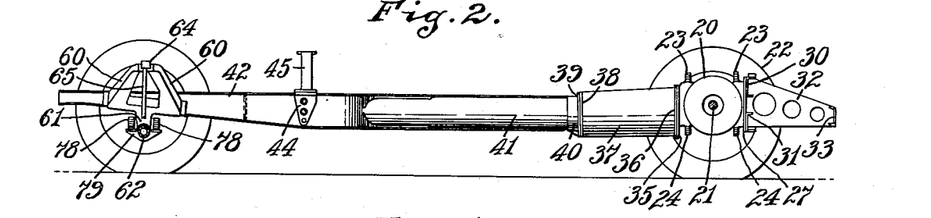
Fig. 2 a side elevation of the parts shown in Fig. 1.
Figure 3:
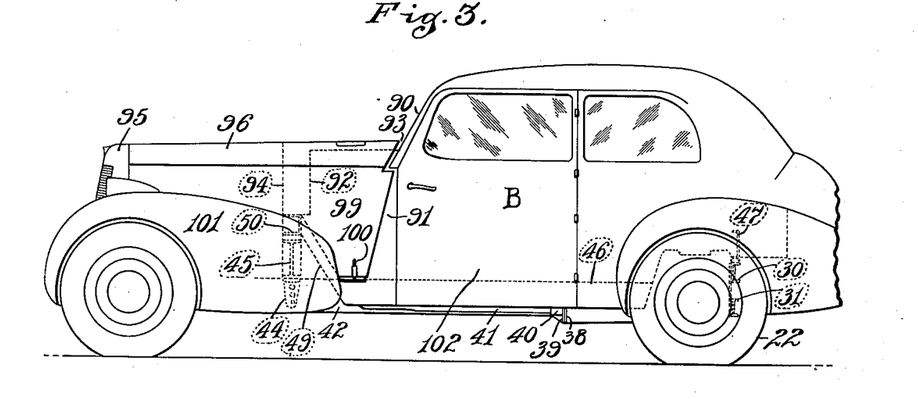
Fig. 3 a side elevation showing a passenger-carrying body applied to the chassis in accordance with our invention.
Figure 15:
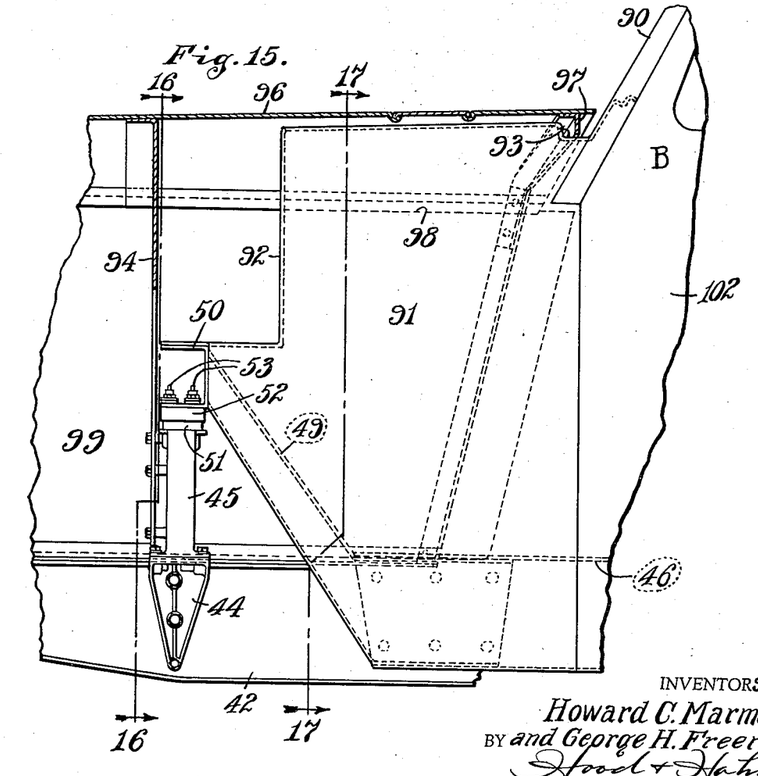
Fig. 15 a vertical section, on a larger scale, of the forward end of the passenger-carrying body, the rear end of the engine hood and adjacent portions of the chassis frame.

Connected to the front ends of channels 46 by upwardly and inwardly converging channels 49, at about the level of the rear cross-bar 47, is a channel cross-bar 50 (Figs. 3, 7 and 15) which rests upon a rubber cushion 51 seated upon arch 45. An inverted basin 52 partially encases cushion 51 and bolts 53 pass down through bar 50 and cushion 51 into arch 45 so as to hold the body frame against substantial lateral play but at the same time permit a desirable amount of vertical and rocking play of bar 50 relative to arch 45 within the limits permitted by the rubber cushion.

It will be readily understood that resilient means other than rubber may be substituted for cushion 51 without departing from our invention.

Secured to each channel 42, near its forward end, is a bracket comprising outwardly and upwardly extending converging arms 60, 60 and a depending lug 61. Bridging and detachably secured to arms 60 is a bracket 64 having a downwardly-presented pocket 64'. Secured to the two lugs 61 is a cross-bar 62 each end of which carries an upwardly-presented pin 63 in alinement with the downwardly-presented pocket 64'. Seated in pocket 64' and sleeved over the subjacent pin 63 is a tubular king-pin 65. The axes of the two king-pins are parallel with each other but their upper ends are inclined slightly rearwardly.

Slidably mounted on each king-pin is a bearing sleeve 70 having upper and lower knuckle bearings 71 and 72, the axis of which, X, (Fig. 13) is transversely inclined to the axis of the king-pin. Sleeved over sleeve 70, but non-rotatively secured thereto by pin 74' is a shackle sleeve 74 to which are pivoted, at 75, two shackle links 76, 76, respectively, pivoted at 77, 77 to the outer ends of the two parallel springs 78, 78 secured to bracket 79 carried by cross-rod 62 at its middle.

Journaled on the two knuckle bearings 71 and 72 respectively, are the two bearing eyes 80 and 81 of the steering wheel knuckle 82 which carries the wheel-spindle 83. The thrust bearing 84 is interposed between the lower end of sleeve 74 and the lower knuckle bearing 72.

Secured to the upper bearing eye 80 is an arm 85 connected by the usual stretcher bars and links (not shown) to the steering post.

Flexible bellows 86 and 87 are connected respectively with the upper and lower ends of sleeve 70 and to the arms 60 and 62. An oiling opening 88 affords access to the interior of the king-pin and suitable openings 89 through the wall of the pin afford proper lubrication for the vertical sliding of sleeve 70 upon the king-pin.

The rear cross-bar 47 is supported upon and rigidly secured to the cross-bar 30 which is carried by and rigid with housing 20.

The axis 65A (Fig. 13) is in a vertical plane; the axis 83A of spindle 83 is inclined outwardly and downwardly so that the medial plane W of the steering (front) wheel will intersect the ground about 2 inches outside the ground intersection of the king-pin plane; and the axis X of bearings 71 and 72 intersects the axis 65A of the king-pin at the intersection of axis 83A therewith and intersects the ground a little short of midway between the intersections with the ground of axis 65A and plane W. In practice it has been found that this arrangement insures ease of steering without too great a drag and with sufficient stability, while at the same time insuring against the development of any lateral stresses on the steering wheels at their ground contacts due to vertical movements of the king-pins and chassis frame accompanying flexing of the front springs. Cross bar 62 is firmly united with lugs 61. Forward of the windshield 90 (Fig. 15) which lies somewhat to the rear of bar 50, body B comprises the arched plates 91 and cross-plate 92 which extend to bar 50 and enclose foot space for the forward passengers and form a false, or hidden cowl which, across its top just forward of the wind shield, is provided with a cross drainage channel 93.

Figure 16:
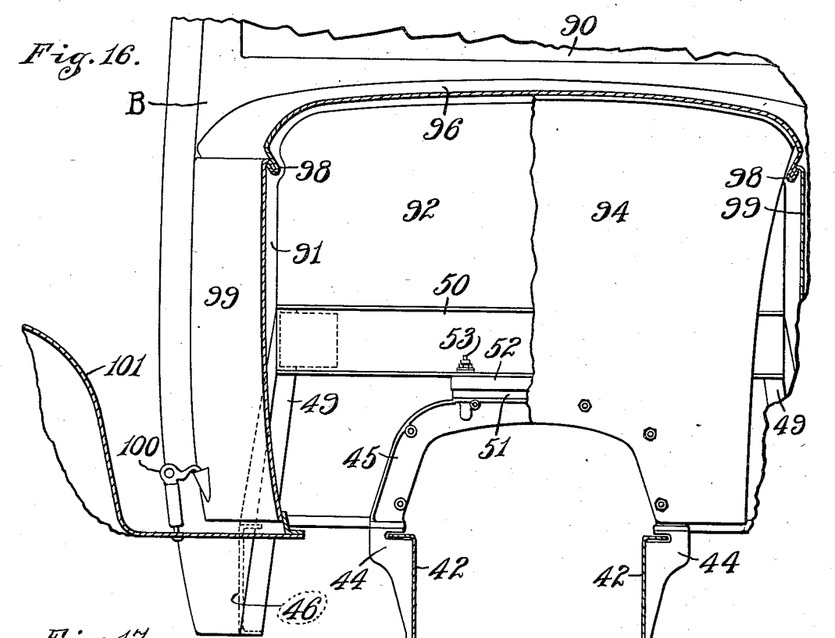
Fig. 16 a transverse section approximately on line 16—16 of Fig. 15.
Figure 17:
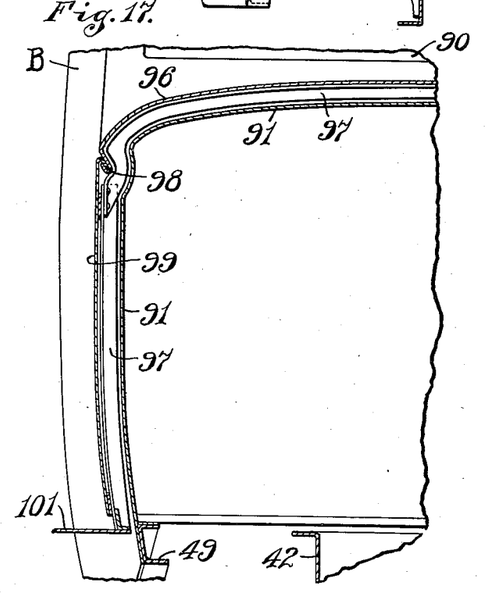
Fig. 17 a fragmentary section approximately on line 17—17 of Fig. 15.

Secured to the front plane of arch 45 is a vertical head plate 94, (Figs. 15, 16) medially notched in its lower edge to substantially conform to arch 45 and afford room for rearward projection of parts of the motor (not shown).

Figure 14:
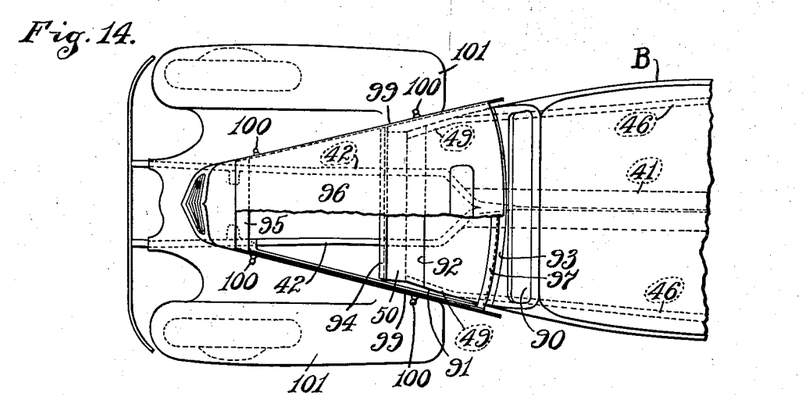
Fig. 14 a plan of the front end of the passenger-carrying body, the engine hood, radiator and front fenders.

Radiator 95 (Fig. 14) is mounted on the chassis members 42 and secured to the radiator and to the upper edge of head-plate 94 is the main top plate 96 of the engine cover, said plate extending rearwardly beyond the head-plate and into close proximity to windshield 90, its rear end being supported by an arched brace 97 (Fig. 15) which is supported by channels 42. Brace 97 is conveniently formed of angle iron with its vertical flange lying in drainage channel 93 so as to form an effective water and wind dam.

Figure 18:
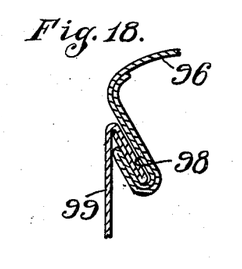
Fig. 18 a fragmentary section, on a larger scale, showing the relation between the upper fixed plate and a removable side plate of the engine hood.

The side edges of plate 96 are formed into upwardly and outwardly-inclined troughs 98 (Figs. 16 and 18) to receive the downwardly and inwardly inclined upper edges of the side plates 99 which complete the engine hood. The rear ends of plates 96 and 99 form a visible cowl which overlies, but is independent of, the false cowl which is part of the passenger-carrying body B.

Plates 99 may be lifted from their seats and are normally held down in place by the usual spring hooks 100.

Secured to the forward ends of channels 42 are the front wheel fenders 101 which carry hooks 100.

The passenger-carrying body B is firmly supported at its rear end on cross-bar 30 extending substantially the entire width of the body, whereas at its front end body B is supported on the rubber cushion 51 which, in effect, forms a one-point support. As a consequence of this construction the frame for the superstruction of body B may be made very rigid so that exceptionally wide doors 102 may be incorporated without danger of cramping and sticking owing to the fact that any twisting of the chassis frame will be absorbed by the rubber cushion. The chassis frame, at the position of arch 45, is comparatively narrow, cushion 51 is still narrower and the four wheels are independently sprung so that the chassis twisting and the effects of such twisting on body B are practically inappreciable.

Figures 11, 12, 13:
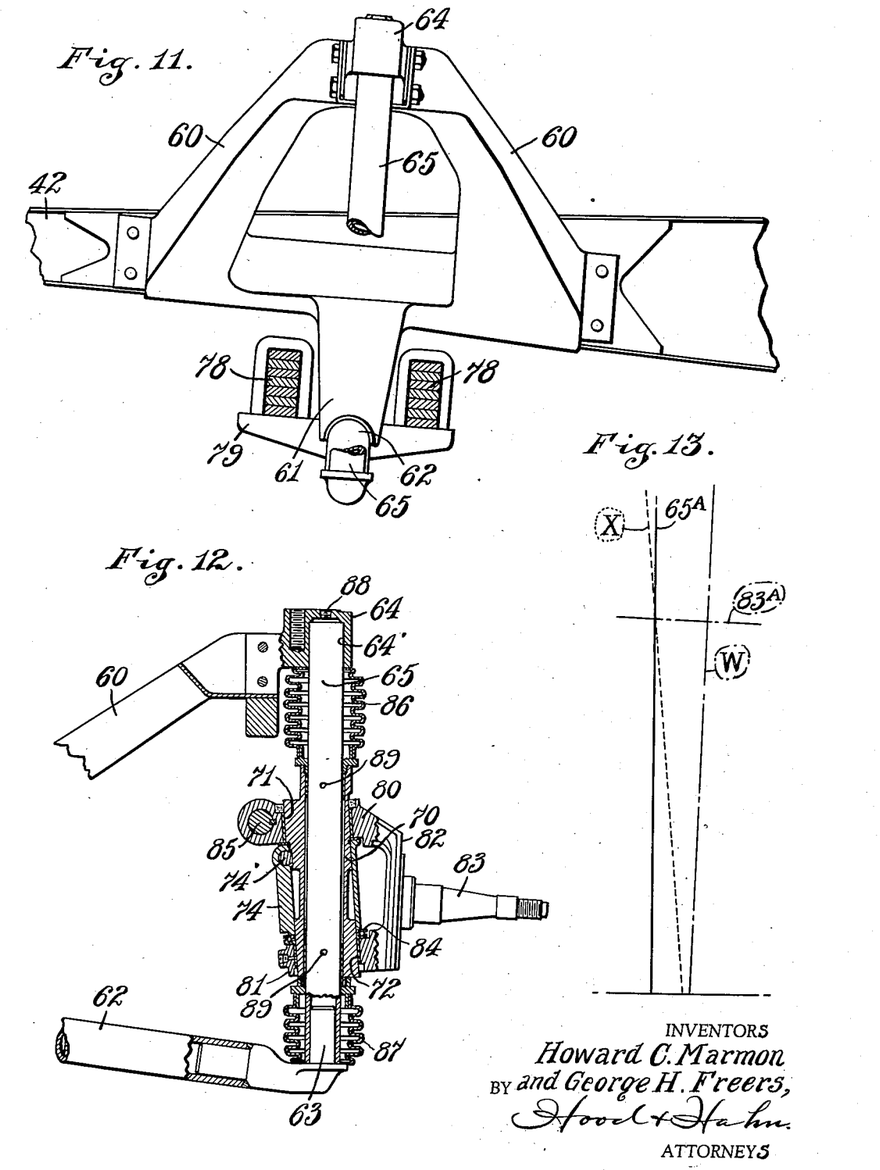
Fig. 11 a fragmentary side elevation, in partial vertical section, of our improved front axle with the wheel spindle omitted.
Fig. 12 a vertical section of one of the front-wheel knuckles and adjacent portions of the front axle.
Fig. 13 a diagram showing the relation of one of the front wheels to its axle.
Figure 19:
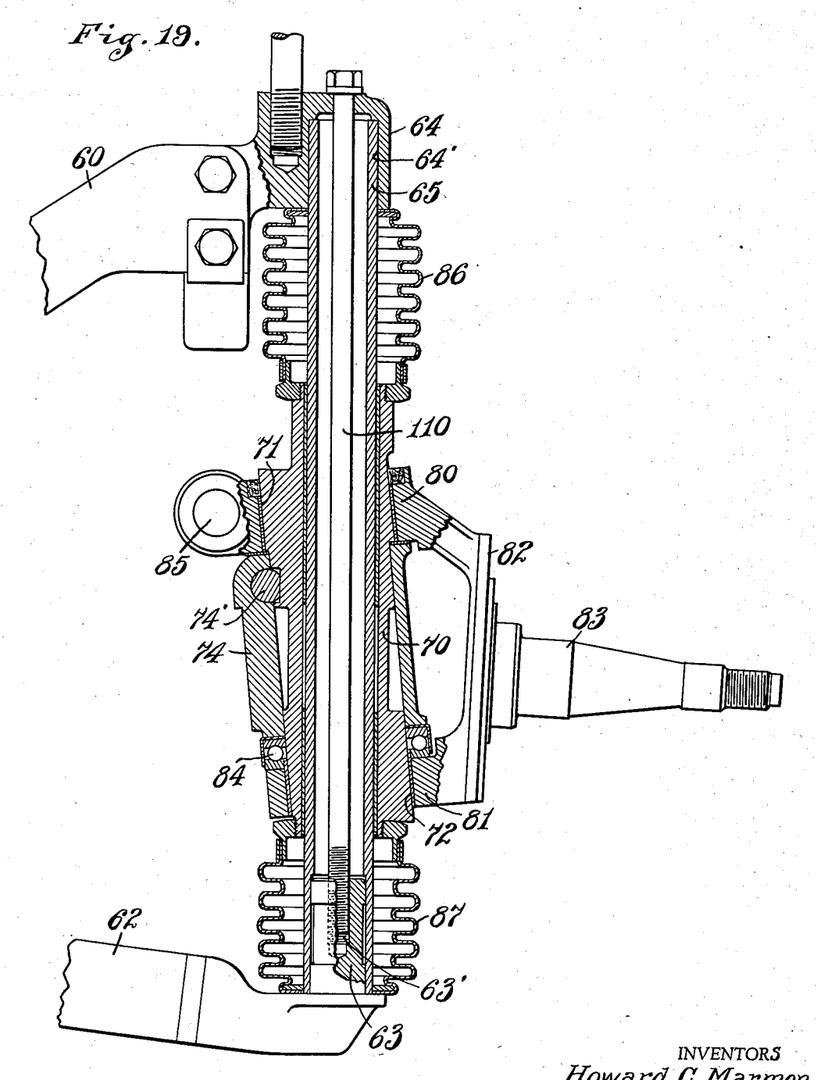
Fig. 19 a vertical section of a modified front wheel mounting.

The construction shown in Fig. 19 is quite similar to that shown in Fig. 12 and similar parts are similarly numbered. In this form the outer ends of arms 60 and 62 are tied together by a bolt 110 which passes down through bracket 64 and the tubular king pin 65 and enters a threaded pocket 63' in pin 63.

Figures 20, 21:
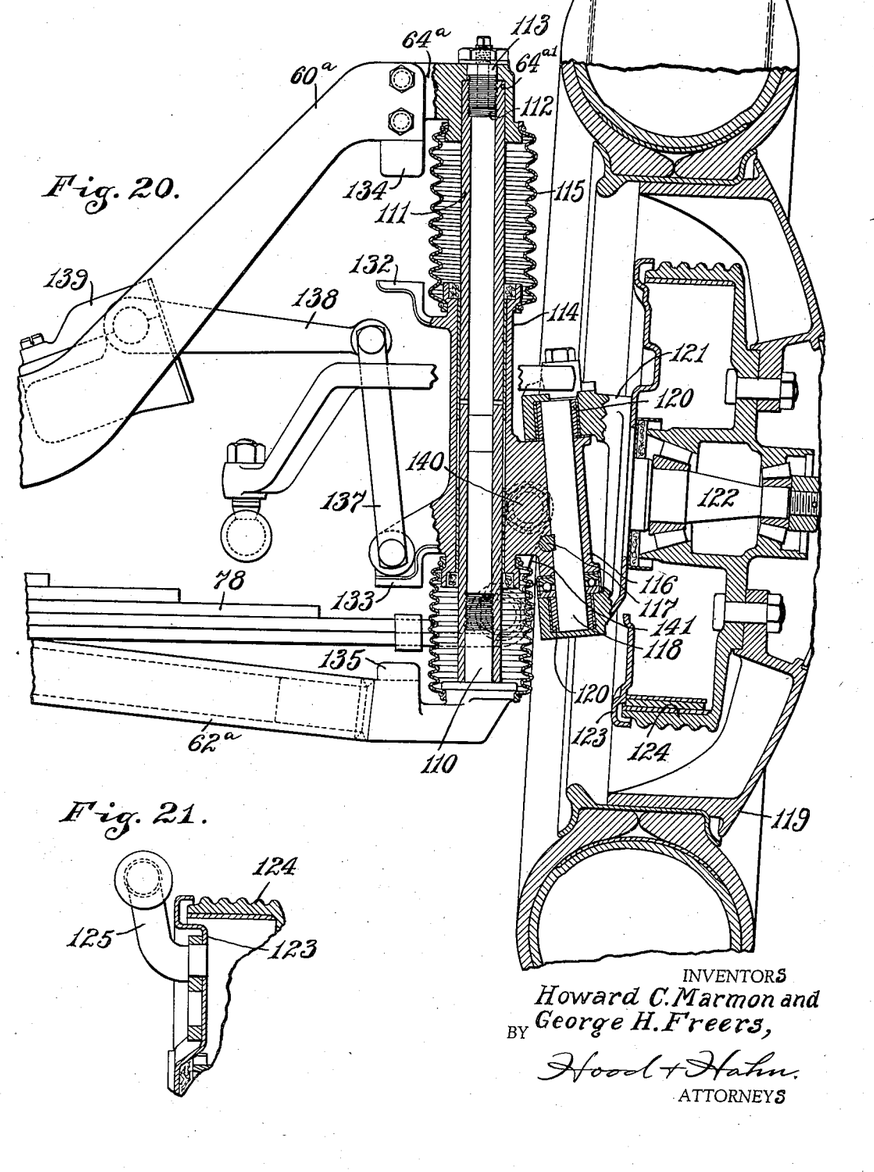
Fig. 20 a vertical section, of another form of front wheel mounting.
Fig. 21 a fragmentary horizontal section, of the structure shown in Fig. 20, showing the stretcher rod arm attached to the backing plate for the brake-drum.

Referring now to Figs. 20 and 21. Parts 60a, 62a and 64a correspond, respectively, to parts 60, 62 and 64 in other figures. Arm 62a at its outer end carries the upwardly-presented pin 110 threaded at its upper end. Sleeved over, and threaded on, pin 110 is the guide tube 111, internally threaded at its upper end, at 112, and seated in the pocket 64a' of bracket 64a. Bolt 113 passes down through bracket 64a and is threaded into threads 112, so that the parts are firmly connected.

Vertically slidable on tube 111 is a sleeve 114 and the spaces between the ends of this tube and the supporting structure are bridged by the dirt-excluding bellows 115.

Sleeve 114 comprises an outwardly projected arm 116, which is secured, by the cam-bolt 117, a non-rotatable king-pin 118 the ends of which project above and below the arm 116. The axis of king-pin 118 is inclined inwardly and upwardly relative to the axis of the guide tube 111 and the pin is so placed and inclined that its axis, extended downwardly, will intersect the ground slightly inside of the point of intersection of the medial plane of the wheel 119 with the ground.

Journaled upon the projected ends of king-pin 118, by suitable interposed anti-friction bearings 120, and straddling arm 116, is the spindle yoke 121 which carries the outwardly projected and slightly downwardly inclined wheel spindle 122, upon which the wheel 119 is journaled.

Secured to yoke 121 is a circular backing plate or cover plate 123 which serves as a guard for the open inner end of the brake drum 124, carried by wheel 119, and secured to this plate is a stretcher rod-arm 125 to which a stretcher rod, not shown, extending between the two front wheels, may be connected. Secured to the upper end of yoke 121 is an arm 130 to which the steering rod 131 is connected.

Sleeve 114 is provided near its upper and lower ends with inwardly-projecting portions 132 and 133 adapted, upon extreme sliding movements of the sleeve, to respectively engage bumper cushions 134 and 135 respectively, carried respectively by the arms 60a and 62a.

Projection 133 serves as a convenient anchorage for one end of link 137, the opposite end of which is connected to lever 138 of a shock absorber 139 of well-known form attached to arm 60a.

Pivoted at 140 to the front and rear faces of arm 116, on an axis substantially midway between the axes of guide tube 111 and king-pin 118, are two links (spring shackles) 141, only one being shown in Fig. 20, and the lower ends of these links are pivotally connected respectively to the outer ends of the two front springs 78.

The construction shown in Fig. 20, while in many respects substantially the same as those shown in Figs. 12 and 19, is somewhat less expensive to build and may more conveniently incorporate anti-friction bearings between the spindle knuckle and the vertically sliding sleeve upon which the knuckle is swiveled. The suspension of the outer ends of the springs between the two shackle links holds the sleeve 114 against rotation about guide tube 111 and, as the axis of the pivotal connection between the upper ends of the shackle links and sleeve 114 is midway between the inclined axis of the king-pin and the sliding axis of the sleeve, tendency of applied loads to cant the sleeve 114 relative to the guide tube 111, is reduced to a minimum and in practice we have found that the structure gives very satisfactory results.

We claim as our invention:

1. In a motor vehicle, the combination with a chassis comprising a main frame supported by independently-sprung wheels, a relatively wide and rigid body-support at the rear end of said frame and a second body-support at an intermediate point in the length of the frame, of a passenger-carrying body supported at its rear end on said wide support and at its forward end by means permitting relative pivotal action about a longitudinal axis.

2. In a motor vehicle, the combination with a chassis comprising a main frame supported by independently-sprung wheels, a relatively wide and rigid body-support at the rear end of said frame, and a second body-support at an intermediate point in the length of the frame, of a passenger-carrying body supported at its rear end on said wide support and at its forward end by means permitting relative pivotal action about a longitudinal axis, and yielding means normally resisting such pivotal action in both directions.

3. In a motor vehicle, the combination with a chassis comprising a main frame supported by independently-sprung wheels, a relatively wide and rigid body-support at the rear end of said frame, and a second body-support at an intermediate point in the length of the frame, of a passenger-carrying body supported at its rear end on said wide support, a comparatively narrower vertically yieldable cushion interposed between the forward body support and the forward end of the body, and means limiting vertical separation of the forward end of the body and the forward body support.

4. In a motor vehicle, the combination of a main chassis frame, supporting wheels, a motor supported on said frame, a load-carrying body superposed on said main frame, a laterally extensive support interposed between the rear ends of the main frame and load-carrying body, a support interposed between the forward end of the load-carrying body and an intermediate portion of the main frame and permitting relative oscillation between the main frame and load-carrying body about a longitudinal axis, a hood top plate supported on the main frame over and above the motor and having a rear portion overlying but independent of the forward end of the load-carrying body, two hood side plates removably suspended upon opposite sides of said top plate, said side plates, at their rear ends, overlying the forward sides of the load-carrying body but independent thereof, and means for detachably anchoring each of said side plates upon the forward end of the main frame.

5. In a motor vehicle, the combination of a main chassis frame, supporting wheels, a motor supported on said frame, a load-carrying body superposed on said main frame, a laterally extensive support interposed between the rear ends of the main frame and load-carrying body, an upwardly-extended arch secured to the main frame to the rear of the motor, a support interposed between said arch and the forward end of the load-carrying body permitting oscillation of the said body relative to the main frame about a longitudinal axis, a hood-arch supported by the main frame to the rear of said last mentioned support for the forward end of the load-carrying body and overlying the load-carrying body but independent thereof, a second hood support carried by the main frame in advance of the load-carrying body, and a hood supported by said hood-arch and said hood support and overlying but independent of the forward end of the load-carrying body.

6. In a motor vehicle, the combination with a chassis comprising a main frame, supporting wheels, a motor supported on the main frame near its forward end and driving connections between the motor and some of the supporting wheels, of a passenger-carrying body, a relatively wide support carried by said main frame for the rear end of the passenger-carrying body, a relatively narrow vertically yielding support interposed between the forward end of the load-carrying body and an intermediate portion of the main frame and permitting relative oscillation between the forward part of the main frame and the passenger-carrying body about a longitudinal axis, and a cover for said motor secured to the frame free of said body.

7. In a motor vehicle, the combination with a chassis comprising a main frame, supporting wheels, a motor supported on the main frame near its forward end and driving connections between the motor and some of the supporting wheels, of a passenger-carrying body, a relatively wide support carried by said main frame for the rear end of the passenger-carrying body, a relatively narrow vertically yielding support interposed between the forward end of the load-carrying body and an intermediate portion of the main frame and permitting relative oscillation between the forward part of the main frame and the passenger-carrying body about a longitudinal axis, a cover for said motor secured to the frame free of said body and having a rearwardly-extended portion telescoped over but independent of the forward end of said passenger-carrying body.

HOWARD C. MARMON.
GEORGE H. FREERS.